United States Patent [19]

Ryan

[11] Patent Number: 5,536,099
[45] Date of Patent: Jul. 16, 1996

[54] STRUCTURAL ARTICLE INCLUDING CAST-IN PLACE BEARING

[75] Inventor: Bobby W. Ryan, Alanson, Mich.

[73] Assignee: Ryan Engineering & Design Co., Inc., Pellston, Mich.

[21] Appl. No.: 262,965

[22] Filed: Jun. 21, 1994

[51] Int. Cl.⁶ .............................. F16B 11/00; F16C 11/00; B25G 3/34; A47C 3/02
[52] U.S. Cl. .............................. 403/269; 403/26; 403/62; 403/265; 29/898.049; 29/719; 297/258.1; 297/272.1; 297/281; 384/490; 384/537
[58] Field of Search .............................. 403/26, 62, 164, 403/186, 265, 269, 361; 164/112, 333; 29/898.49, 719; 384/462, 474, 475, 490, 537; 297/248, 258, 272, 273, 281

[56] References Cited

U.S. PATENT DOCUMENTS

| 4,108,415 | 8/1978 | Hauray et al. | 297/281 X |
| 4,179,313 | 12/1979 | Koch et al. | 29/898.049 X |
| 4,213,650 | 7/1980 | Sroub | 297/281 |
| 5,186,549 | 2/1993 | Walters et al. | 384/505 |
| 5,310,268 | 5/1994 | Schlereth | 384/537 |

Primary Examiner—Blair Johnson
Assistant Examiner—Bruce A. Lev
Attorney, Agent, or Firm—Price, Heneveld, Cooper, DeWitt & Litton

[57] ABSTRACT

An article, such as a swing arm for a glider chair, includes an elongated structural member made of high strength aluminum, and a pair of cast-in place preassembled bearings located in opposing ends of the structural member and facing in opposite directions. The preassembled bearings each include a first cup-shaped bearing member defining an outer depression for secure engagement by the material of the structural member and an inner ring-shaped ball race or track. The preassembled bearings each further include a second tubular bearing member defining an outer ring-shaped ball race or track and an internal passageway. Ball bearings are positioned between the first and second ring-shaped races for movably supporting the second bearing member on the first bearing member. Lubricant can be added through the passageway in the second bearing member into the area of the ball bearings for lubricating the ball bearings. The passageway of the second bearing member is threaded to receive an attachment screw, which attachment screw holds the lubricant within the bearing. A method and apparatus for manufacturing the structural article are also disclosed and claimed.

16 Claims, 3 Drawing Sheets

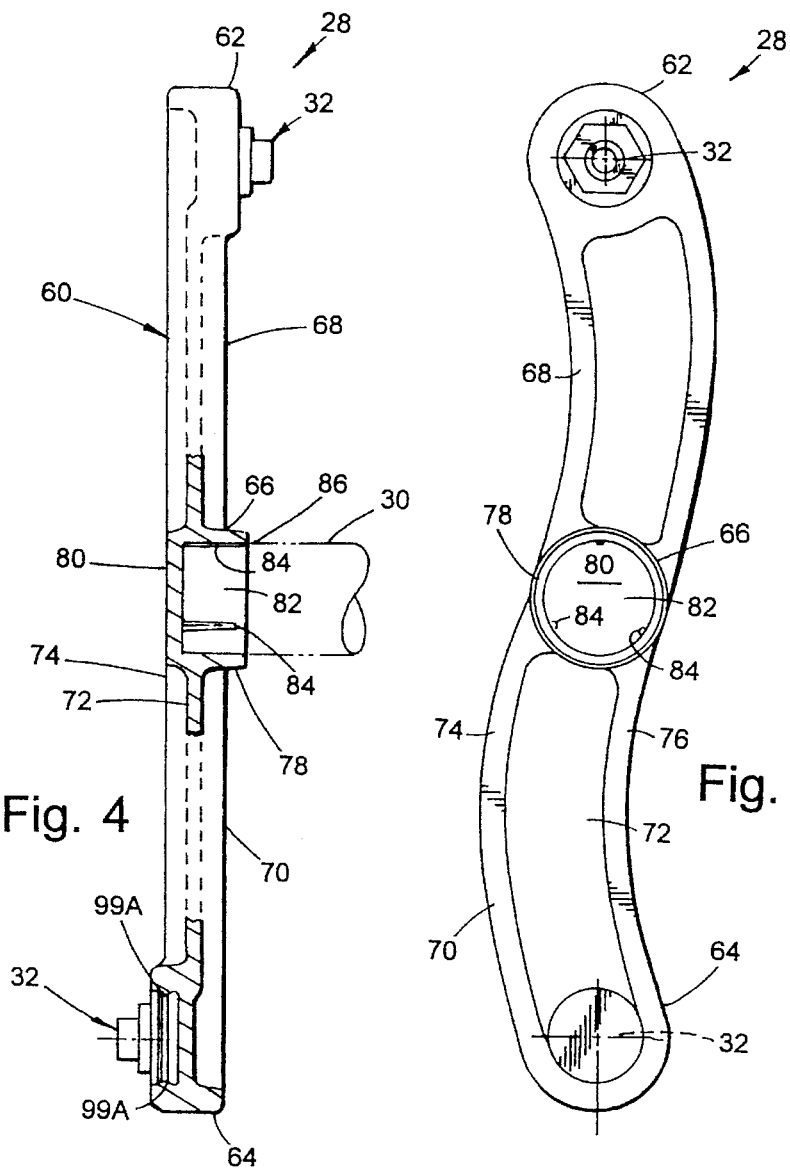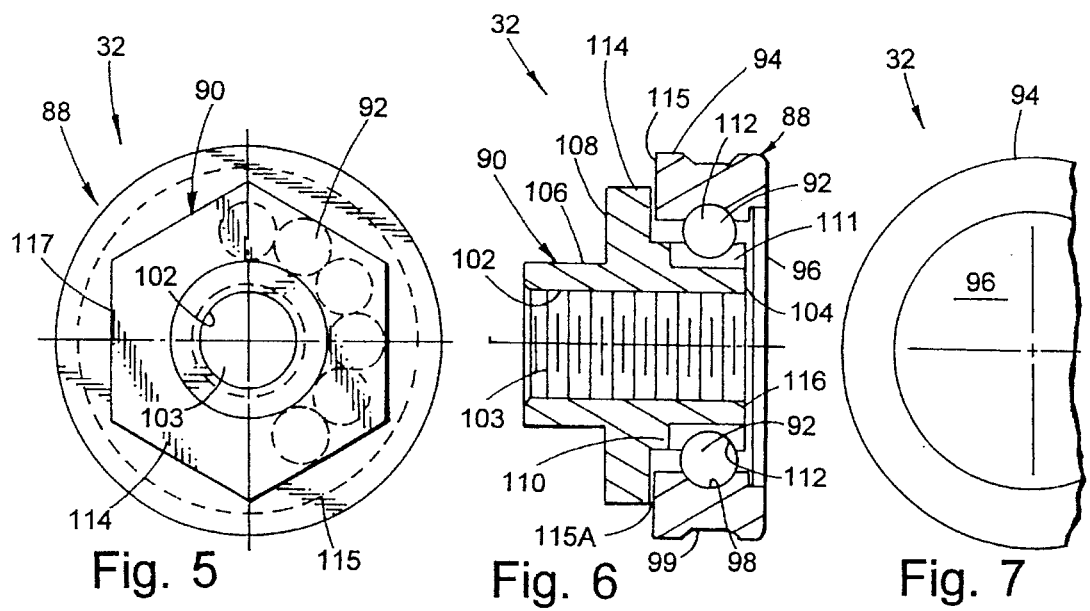

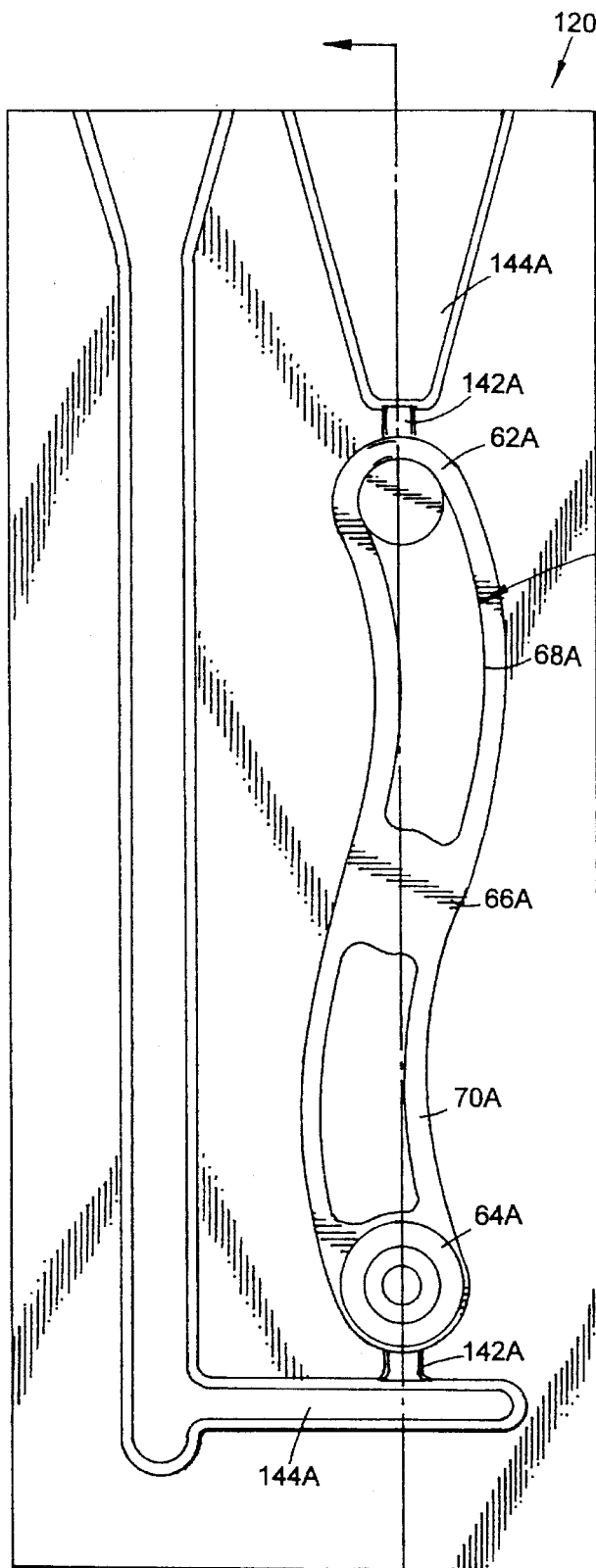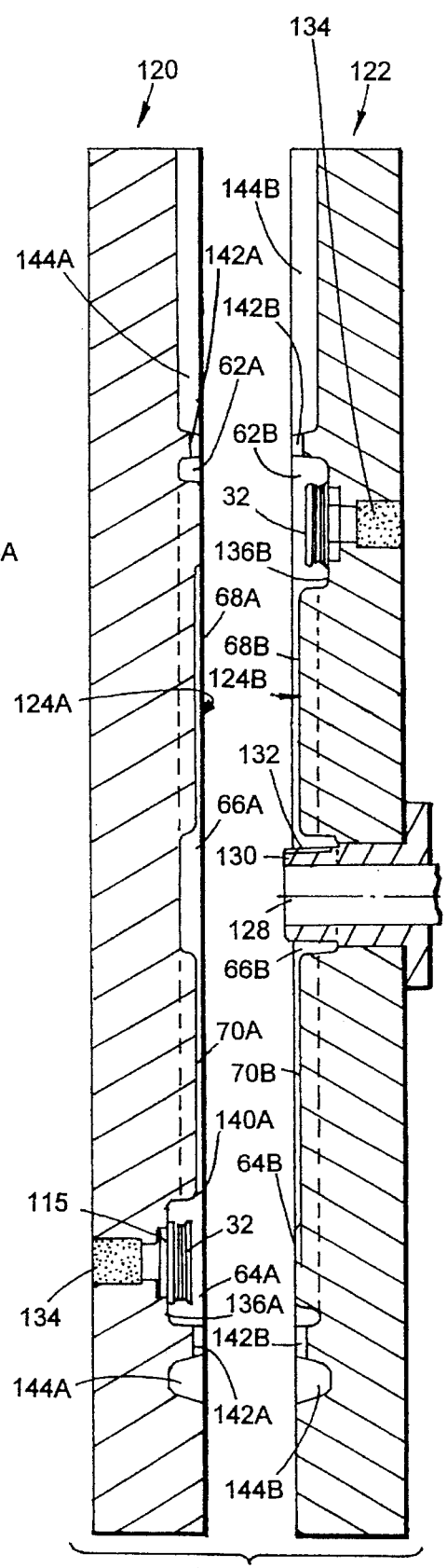
Fig. 8
Fig. 9

STRUCTURAL ARTICLE INCLUDING CAST-IN PLACE BEARING

BACKGROUND OF THE INVENTION

The present invention concerns structural articles including cast-in place bearings, and in particular concerns a structural article including preassembled bearings cast in place on a structural member, the preassembled bearings including a second bearing member movably supported on a first bearing member. The present invention further includes a method and tool for casting the structural article.

Preassembled ball bearings are often attached to a first structure to pivotally support a second structure on the first structure. However, known processes for attaching and securing these bearings require secondary operations and significant post casting/forming and processing of the first structure, such as machining, press-fitting, and reforming of material in the structure.

In the glider chair industry, bearings have historically been embedded in a wooden swing arm. However, longer and flatter glide paths are now being required in the industry, and thus longer swing arms are necessary to achieve the longer and flatter glide paths. Wood is not acceptable in many applications for the longer glide arms necessary to achieve the longer and flatter glide paths since the wood has a limited strength and inherent "defects" that will tend to crack or fracture if over-stressed. To date, most manufacturers have not considered metal swing arms commercially attractive due to their appearance and cost of manufacture and assembly.

Thus, an article for solving the aforementioned problems is desired, along with a method and tool for manufacturing same.

SUMMARY OF THE INVENTION

The present invention includes a structural article having a structural member, and a preassembled bearing cast in place in the structural member. The preassembled bearing includes a first bearing member, and a second bearing member movably supported by the first bearing member. The structural member includes a section of material partially encapsulating the first bearing member as cast with the second bearing member being accessible for pivotally supporting a second article on the structural article. These and other advantages and features of the present invention will become more apparent from the study of the following description taken in conjunction with the drawings described below.

BRIEF DESCRIPTION OF THE DRAWINGS

FIG. 3 is an enlarged side view of the swing arm shown in FIG. 1;

FIG. 4 is a front view of the swing arm shown in FIG. 3 partially broken away to show a cast-in place bearing at one end and further partially broken away to show the dowel receiving pocket in the center of the swing arm;

FIGS. 5–7 are end, side, and opposite end views of the bearing shown in FIG. 3, FIG. 6 being a side cross-sectional view;

FIG. 8 is a plan view of a mold half for casting the swing arm shown in FIG. 3; and FIG. 9 is a cross-sectional view of a pair of mold halves for casting the swing arm, one of the mold halves being that shown in FIG. 8.

DETAILED DESCRIPTION OF PREFERRED EMBODIMENTS

It is to be understood that the present invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
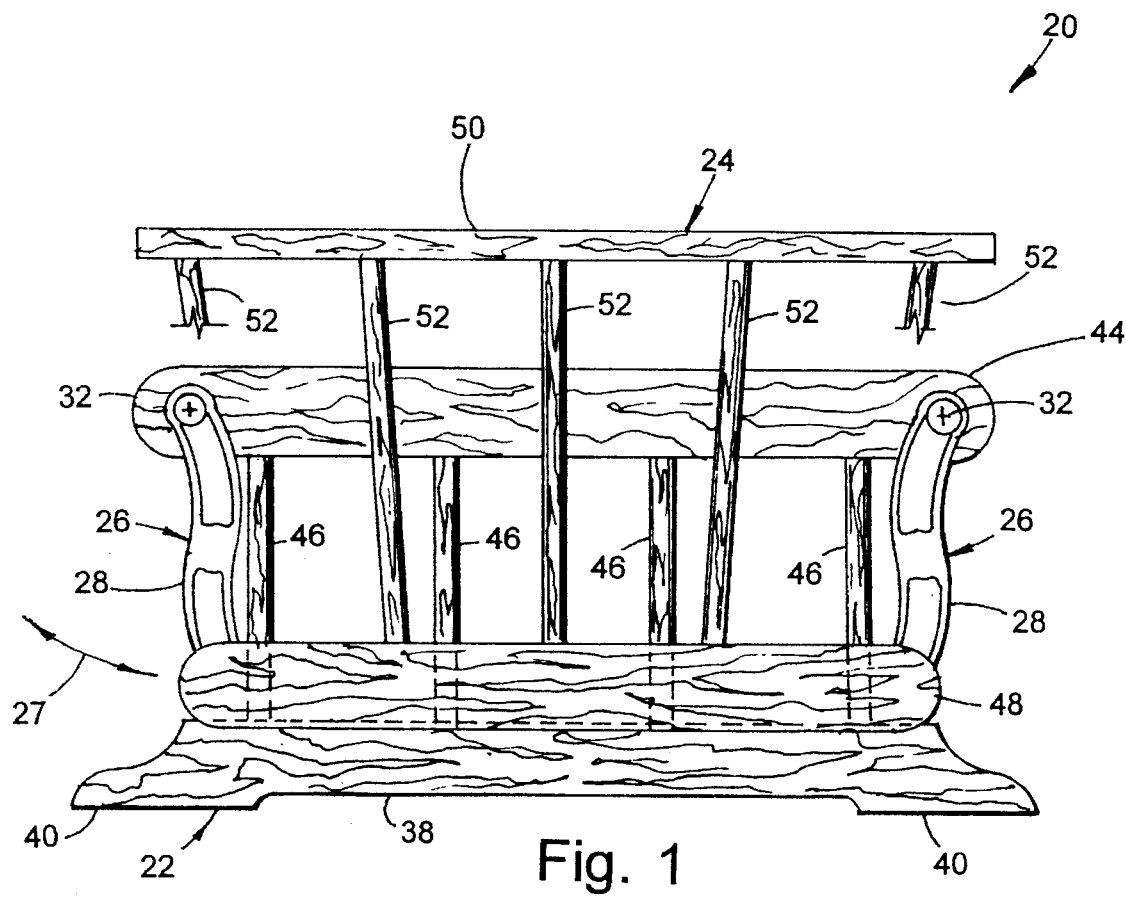
FIG. 1 is a side view of the base of a glider chair embodying the present invention glider chair base including swing arms having cast-in place bearings.
Figure 2:
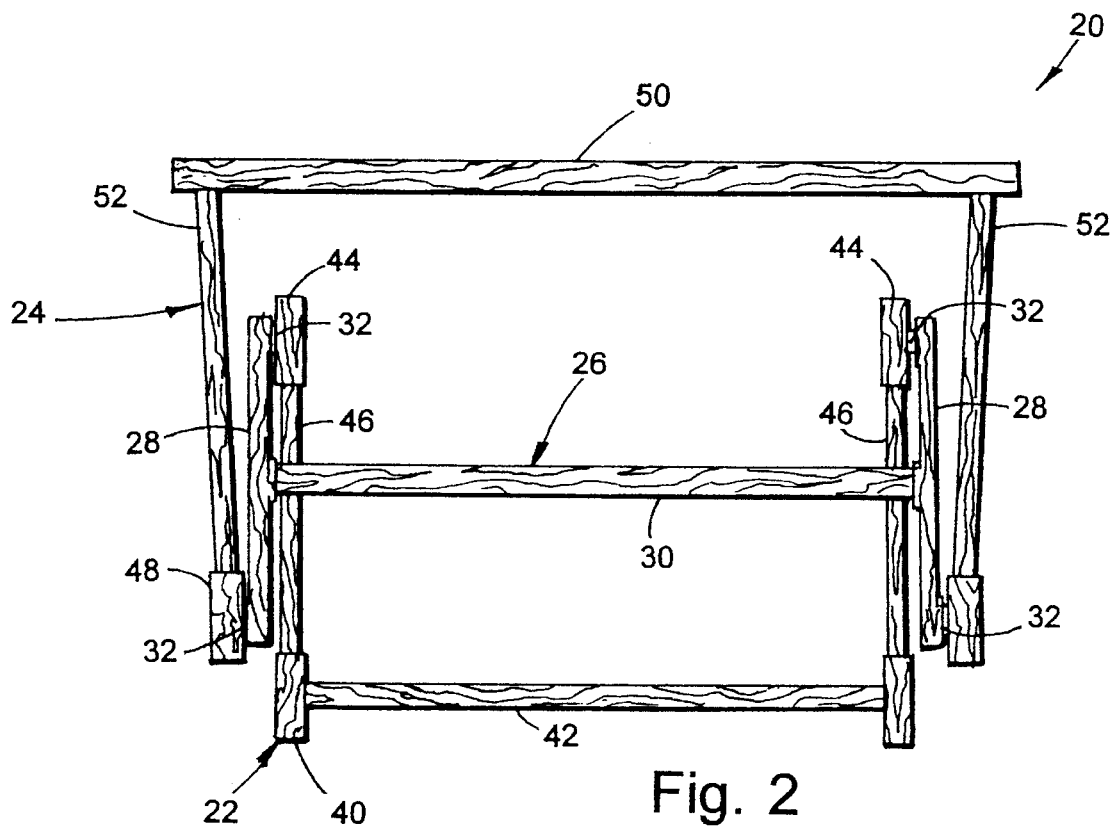
FIG. 2 is a front view of the glider chair base shown in FIG. 1.

A glider chair base 20 (FIGS. 1–2) embodying the present invention includes a floor engaging stationary frame 22, a movable seat defining frame 24, and a pair of swing arm assemblies 26 for movably supporting movable frame 24 on stationary frame 22. Each swing arm assembly 26 includes two swing arms 28 interconnected by a wooden dowel 30. Cast-in place bearings 32 are located in opposing ends 34 of swing arms 28 and face in opposite directions. One bearing 32 is secured to movable frame 24 and the other bearing 32 is secured to stationary frame 22. Bearings 32 each include a movable bearing member 90 movably supported on a second bearing member 88 by ball bearings 92 to provide a low friction support. Bearings 32 are configured to be cast-in-place in swing arms 28 and lubricated after casting, thus reducing overall cost of manufacture. The high strength metal forming swing arms 28, in combination with bearings 32, provide a durable and long lasting arrangement for movably supporting a seat defining frame 24 for movement along a glide path 27.

Floor engaging stationary frame 22 (FIGS. 1–2) is typically made from wood for aesthetics and includes a pair of floor engaging transverse members 38 having spaced feet 40, and two or more dowels 42 interconnecting transverse members 38. Elevated beams 44 are supported over each transverse member 38 by multiple, generally vertical dowels 46. Seat defining frame 24 includes lower frame members 48, and an upper frame member 50 supported over lower frame member 48 by generally vertical dowels 52 that rigidly connect members 48 and 50.

The focus of the present invention is on swing arm assembly 26, and in particular on swing arms 28. Traditionally, swing arms have been made from wood sections which were bored/finished to receive press-fit bearings in each end. The bearings were configured to support a movable frame on a stationary frame. However, traditional wooden swing arms may split or crack with time and stress, often because of characteristics inherent in the wood material. Also, recently the industry is demanding longer glide paths, which requires a longer wood swing arm member having increased problems/defects such as are noted above.

Swing arm article 28 (FIGS. 3–4) includes an elongated structural metal member 60 having end sections 62 and 64 and a center section 66 interconnected by arcuate beam-like sections 68 and 70, respectively. Beam-like section 68 has an "I" beam-shaped cross section including center web 72 and transverse edge webs 74 and 76. Beam-like section 70 is identical to beam-like section 68, and is positioned 180° around center section 66 from beam-like section 68. Center section 66 is cup-shaped and includes a ring-shaped sidewall 78 from which beam-like sections 68 and 70 extend. Center section 66 further includes a planar end wall 80 that lies generally in the same plane as edge web 74. Sidewall 78 and end wall 80 form a cylindrically-shaped pocket 82 for receiving the end 86 of dowel 30 on swing arm assembly 26. Three ridges 84 extend into pocket 82 along sidewall 78 to frictionally engage the end 86 of dowel 30 to securely retain the dowel in pocket 82.

Bearings 32 (FIG. 3) are located in the end sections 62 and 64 of spring arm 28 and face in opposite but parallel directions. Bearing 32 (FIGS. 5–7) includes first bearing member 88, and a second bearing member 90 movably supported on first bearing member 88 by ball bearings 92. First bearing member 88 is cup-shaped and includes a ring-shaped sidewall 94 and planar end cap 96. Ring-shaped sidewall 94 includes a ring-shaped bearing race or track 98 on its inner surface for supporting ball bearings 92, and further includes an exterior ring-shaped channel 99 on its outer surface for secure engagement by a lip 99A (FIG. 3) on the end sections 62 and 64. Second bearing member 90 is a tubular member including a threaded inner surface 102 defining a passageway 103, an end 104, and an outer surface 106 having an annular ridge 108. Ridge 108 is L-shaped in cross-section and is located about midway along outer surface 106 with the short leg 110 of the L-shaped ridge 108 being oriented toward end 104. A ball bearing engaging ring 111 is press-fit onto outer surface 106 against short leg 110. Ball bearing engaging ring 111 includes a ring-shaped race or track 112 which cooperates with ring-shaped channel 98 on first bearing member 88 to retain ball bearings 92 therebetween. The long leg 114 of L-shaped ridge 108 is located adjacent a side flange 115 on ring 94 and defines a small gap 115A with side flange 115. The small gap 115A retains lubricant within bearing 32 and prevents debris from entering the area of ball bearings 98.

There is a gap 116 located between end 104 of second bearing member 90 and end cap 96 of first bearing member 88. Thus, lubricant can be added to bearing 32 through passageway 103 and gap 116 into the area around ball bearings 92 and channels 98/112. Small gap 115A retains lubricant in the bearing, but allows exit of entrapped air as bearing 32 is being filled with lubricant. Long leg 114 defines a hexagonally-shaped exterior surface 117 so that it can be held by a wrench while a screw 117A (FIG. 2) is threaded into threaded inner surface 102 of second bearing member 90. The insertion of the screw into second bearing member 90 closes passageway 103, and thus traps the lubricant within bearing 32.

A mold for casting the swing arm article 28 (FIGS. 8–9) includes mold halves 120 and 122 that include cavities 124A and 124B defining article 28. In particular, cavity 124A includes surfaces 62A, 64A, 66A, 68A and 70A and also mold cavity 124B includes surfaces 62B, 64B, 66B, 68B and 70B for forming respective sections 62, 64, 66, 68 and 70 of structural member 60. A molten material inlet 128 is defined in mold half 122 at center section 66B. An insert 130 defines inlet 128 and further includes a ring-shaped surface 132 defining the inside of pocket 82 including ridges 84 (FIGS. 3–4). A rare earth permanent magnet 134 (FIGS. 8–9) is located on each of surfaces 62A and 64B for holding bearings 32A and 32B in respective mold halves 120 and 122 during the injection of molten material into the combined cavity 124A/124B. The side surface 115 on first bearing member 88 sealingly engages a lip 136A on mold surface 64A (or lip 136B on mold surface 62B) and prevents flow of molten material from flowing onto and around the movable second bearing member 90. Also, the lip 140A defined at the juncture of beam-like section 70A and end section 64A tends to direct flowing molten material past the seal formed between bearing surface 115 and mold surface 136A. Overflow gates 142A and 142B, and overflow reservoirs 144A and 144B are located at the ends 62A, 62B, 64A, 64B to allow overflow of molten material and to allow outflow of gases within the combined cavity 124A/124B as the cavity is filled.

The method of casting structural article 28 includes positioning bearings 32A and 32B on magnets 134A and 134B in mold halves 120 and 122. Mold halves 120 and 122 are closed against each other and tightly clamped, and then molten high strength aluminum material is injected through inlet 128 into combined cavity 124A/124B. The molten material fills combined cavity 124A/124B and flows out of overflow gates 142A and 142B. In the preferred embodiment of swing arm article 28, high strength aluminum is used. However, it is contemplated to be within the scope of the present invention to include other materials such as metals, polymeric materials or other structural materials. Also, the present invention is not contemplated to be limited to only swing arms.

Thus, an article is provided including cast-in place bearings, the bearings beings preassembled and including a moveable member supported on a stationary member. The bearings are configured to facilitate post-casting lubrication and to facilitate the casting process. A method of manufacture and casting molds are also disclosed and claimed.

In the foregoing description it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A structural article comprising:

a structural member made of cast material;

a preassembled bearing having a first bearing member with a closed end and sides, and a second bearing member movably supported on said first bearing member by roller bearings positioned therebetween; and said structural member including a section of integrally cast material partially encapsulating the closed end and sides of said first bearing member as cast with said second bearing member being accessible in a direction opposite the closed end for pivotally supporting a second article on said structural article, said first bearing member including a retaining depression and said integrally cast material filling the retaining depression to retain the preassembled bearing to the structural member without the need for secondary forming operations.

2. A structural article as defined in claim 1 wherein said second bearing member defines an access port for adding lubricant between said first bearing member and said second bearing member to lubricate said preassembled bearing.

3. A structural article as defined in claim 2 wherein said first bearing member is cup-shaped and includes an annular wall having a first ring-shaped depression therein, and wherein said second bearing member includes a stem defining a second ring-shaped depression, said roller bearings being located in said first and second ring-shaped depressions.

4. A structural article as defined in claim 3 wherein said second bearing member is tubular and defines a passageway therethrough and includes an end, wherein said first bearing member includes an end cap positioned proximate to said end of said first bearing member but spaced therefrom to define a gap, said passageway and said gap defining a path for lubricant to be injected into said preassembled bearing between said first and second bearing members.

5. A structural article as defined in claim 1 including a second preassembled bearing, said first and second preassembled bearings being located at opposite ends of said structural member.

6. A structural article as defined in claim 5 wherein said first and second preassembled bearings define first and second axes of rotation, said first and second axes being parallel, said first and second preassembled bearings facing in opposite directions.

7. A structural article as defined in claim 1 wherein said structural member is elongated and includes a recess for receiving and frictionally non-rotatingly engaging a connecting member.

8. A structural article as defined in claim 1 wherein said structural member is elongated and forms a swing arm for a glider chair assembly.

9. A structural article as defined in claim 1 wherein said structural member is made from high strength aluminum.

10. A swing arm for furniture comprising:

an elongated cast metal structural member;

a preassembled bearing having a first bearing member, roller bearings operably positioned on said first bearing member, and a second bearing member rotatably positioned on said first bearing member and rollingly engaging said roller bearings; and said structural member including a section of integrally cast material encapsulating said first bearing member with said second bearing member projecting laterally and being accessible for pivotally supporting a second article on said structural article, said first bearing member including a depression, and said section of material of said structural member including a section of integrally cast material securely engaging said depression, said second bearing member having an end that defines a passageway with said first bearing member for receiving lubrication to facilitate lubrication of said preassembled bearing after the structural member has been cast onto the preassembled bearing.

11. A swing arm as defined in claim 10 wherein said structural member further includes a recess for securely non-rotatingly engaging a connecting member.

12. A method comprising:

providing a preassembled bearing including a stationary member having a retaining depression on an outer surface, roller bearings, and a movable member operably supported on the ball bearings; and casting a structural member around said preassembled bearing including a section of material at least partially encapsulating an end and sides of the stationary member of said preassembled bearing further filling the retaining depression.

13. A method as defined in claim 12 including lubricating said preassembled bearing after said step of casting by injecting lubricant through a longitudinally extending passageway in the movable member to the ball bearings.

14. A method as defined in claim 13 wherein said movable member is supported on ball bearings and said step of lubricating includes lubricating said ball bearings.

15. A method as defined in claim 12 including providing a pair of said preassembled bearings, and wherein said step of casting includes encapsulating one of said pair of preassembled bearings at each end of said structural member.

16. A swing arm for furniture comprising:

an elongated cast metal structural member of high strength aluminum, the structural member having first and second ends, a middle section, and elongated beam-like sections connecting the first and second ends to the middle section, the middle section defining a recess for receiving and supporting an end of a dowel, the elongated beam-like sections having an "I" shaped cross section, the first and second ends forming first and second pockets facing in opposite directions; and first and second bearings positioned in said first and second pockets, each of said first and second bearings including a cup-shaped first bearing member having an end wall and first side walls, a tubular second bearing member having a second side wall, and ball bearings operably captured between the first and second side walls, the second bearing member defining with said first bearing member a passageway facilitating lubrication of the ball bearings, the passageway extending through the second bearing member along an axial centerline thereof and extending between the second side wall and the end wall of the first side wall and further extending between the first and second side walls to a location proximate the ball bearings, the first side wall of the second bearing further having an exterior surface defining a recess for receiving a section of integrally cast material of the cast metal structural member to retain the first bearing member to the structural member.

* * * * *